United States Patent [19]
Walter et al.

[11] Patent Number: 6,082,478
[45] Date of Patent: *Jul. 4, 2000

[54] LIFT AUGMENTED GROUND EFFECT PLATFORM

[75] Inventors: William C. Walter, Placerville; Marshel Thomas Johnson, Castro Valley, both of Calif.

[73] Assignee: Hybricraft, Inc., San Rafael, Calif.

[ * ] Notice: This patent is subject to a terminal disclaimer.

[21] Appl. No.: 09/015,042

[22] Filed: Jan. 28, 1998

Related U.S. Application Data

[63] Continuation-in-part of application No. 08/236,646, May 2, 1994, Pat. No. 5,803,199.

[51] Int. Cl.[7] ....................................................... B60V 1/11
[52] U.S. Cl. ........................ 180/120; 180/117; 224/12.2
[58] Field of Search .................................. 180/117, 116, 180/120, 118, 121, 126, 127–129; 244/73 B, 73 C, 12.2, 23 C; 114/67 A

[56] References Cited

U.S. PATENT DOCUMENTS

| | | | |
|---|---|---|---|
| 3,233,693 | 2/1966 | Havercamp | 180/120 |
| 3,401,767 | 9/1968 | Barr | 180/121 |
| 3,414,076 | 12/1968 | Bertin et al. | 180/121 |
| 3,601,215 | 8/1971 | Nissen | 180/120 |
| 3,647,018 | 3/1972 | Croix-Marie et al. | 180/121 |
| 5,803,199 | 9/1998 | Walter | 180/120 |

FOREIGN PATENT DOCUMENTS

| | | | |
|---|---|---|---|
| 236755 | 11/1961 | Australia | 180/120 |

Primary Examiner—Anne Marie Boehler
Attorney, Agent, or Firm—Fulwider Patton Lee & Utecht, LLP

[57] ABSTRACT

The lift augmented ground effect platform of the present invention is characterized by two pair of annular concentric air curtain nozzles and supercharge nozzles which direct respective jet streams downward and inward beneath the downwardly facing lifting surface of the platform. The concentric arrangement of the nozzles provides an inner or central supercharged air cushion surrounded by an inner central air curtain and an outer or peripheral air cushion surrounded by a peripheral air curtain. The present invention provides an increased or "large" augmentation of the forces acting to raise or lift the platform over that experienced in prior ground effect devices by directing an air flow stream over the downwardly curved peripheral surface of the platform. As the air flows downwardly along the curvature of the platform's peripheral surface, it creates a negative pressure differential which provides an additional lifting force contributing to support of the platform. The airflow stream and the jet stream are provided by, for example, propeller(s) or rotating fan device(s) mounted exterior or interior of the platform. The exterior mounting or specialized interior mounting provides two benefits: first, the propeller or fan stall due to the jet stream source is eliminated and second, smooth transition into free air (out of ground effect) is permitted where necessary to navigate rivers, canyons, and other types of physical barriers which may disrupt ground effect operation. An unpowered variation of the platform may be adapted for releasable attachment to a separate powered vehicle to serve as a performance enhancing lift augmentation platform.

11 Claims, 12 Drawing Sheets

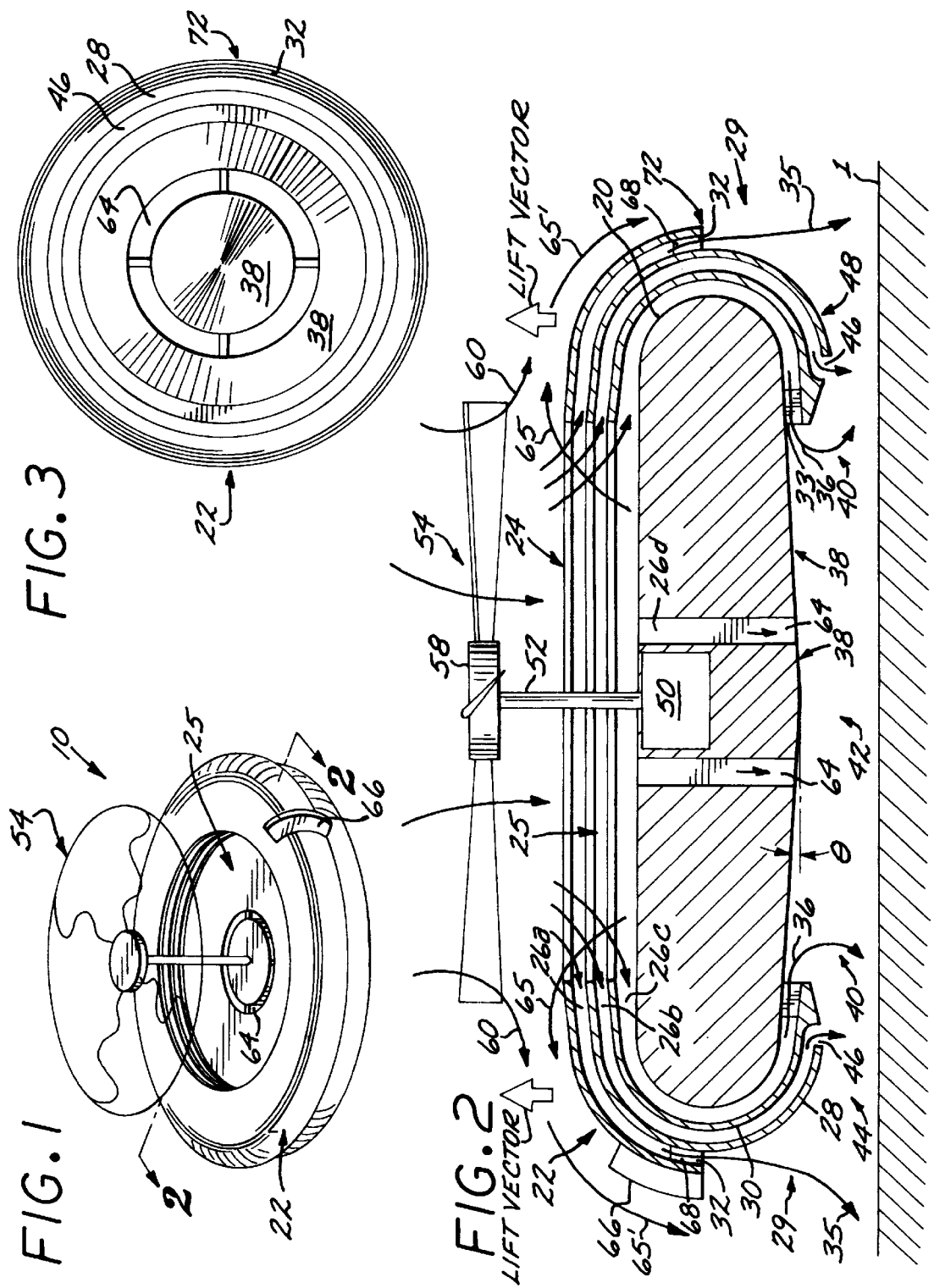

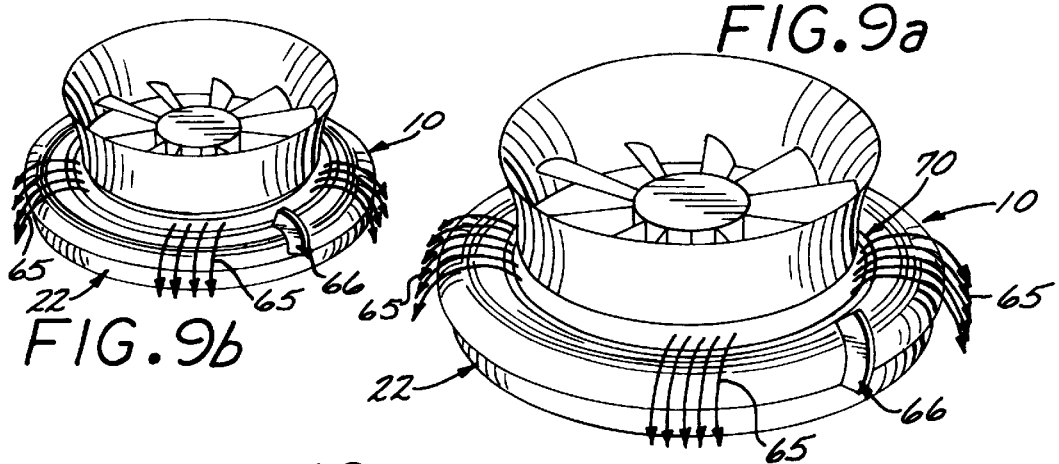
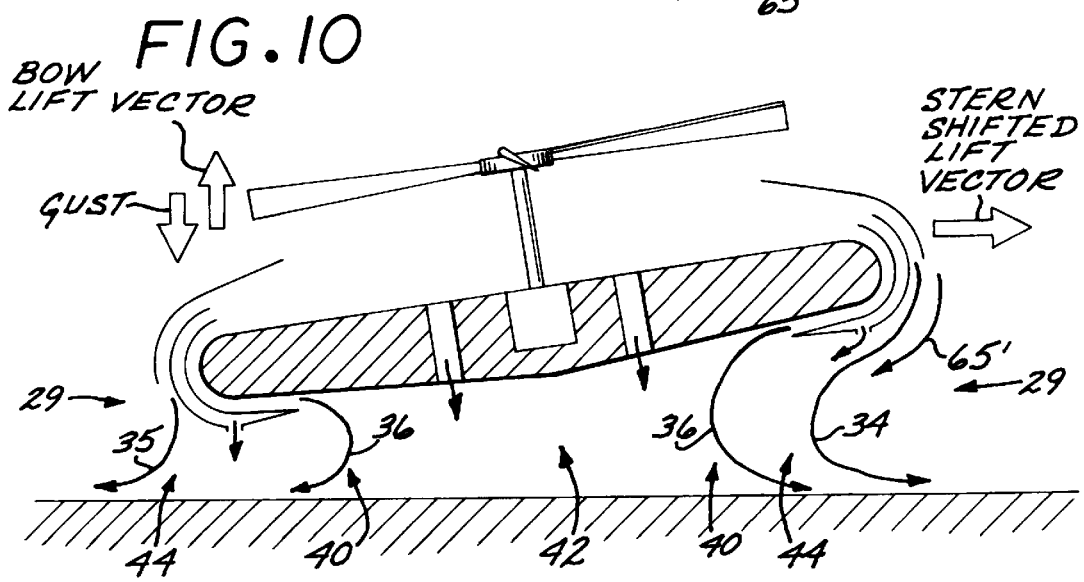
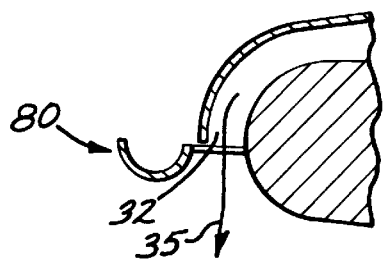
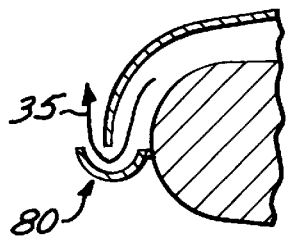

6,082,478

LIFT AUGMENTED GROUND EFFECT PLATFORM

This application is a Continuation-In-Part of application Ser. No. 08/236,646 filed May 2, 1994 which issued on Sep. 8, 1998 as U.S. Pat. No. 5,803,199 which is co-owned by the assignee of the present application. The parent application is hereby expressly incorporated herein by reference in its entirety.

FIELD OF INVENTION

The present invention relates generally to ground effect or air cushion devices and, more particularly, to ground effect devices operating without a skirt extending beneath the vehicle.

BACKGROUND OF INVENTION

Various types or designs of ground effect or air cushion devices have been developed over the years. These have included traditional hovercraft in which a physical skirt is provided about the bottom perimeter of the craft and an air stream is forced beneath the craft within the physical skirt providing a cushion of air which lifts the vehicle and maintains it at a predetermined operating height. These types of skirted hovercrafts have suffered from their inability to operate over uneven terrain and also their inability to climb or descend slopes or inclines. Furthermore, the presence of their skirts can create problems with their operation in certain environments.

Other types of ground effect or air cushion devices have included vehicles which include downwardly opening central jet nozzles which emit high pressure jet streams for forming central support columns and other vehicles which provide a peripheral jet stream for forming a peripheral air cushion for supporting the vehicle. These prior devices have suffered from a lack of stability when operated at a height above 10–20% of the vehicle's diameter.

A common feature of these prior air cushion or ground effect devices is that the air or jet stream producing source is positioned within the body of the device and during operation air is drawn into the body of the device and forced out of the undercarriage of the device, usually at high pressure. Such designs have restricted or limited the efficiency and operational parameters of the devices.

In addition to operational problems at heights above 10–20% of their external diameters and over uneven terrain or inclines, the prior ground effect vehicles also suffered from an inability to navigate physical barriers such as rivers, canals, ditches or the like. These types of obstacles or barriers present situations in which the operating surface (the ground) severely drops away forming a near vertical drop. Prior ground effect vehicles could not navigate these types of barriers.

Further, prior air cushion or ground effect devices have generally required a second propulsion system or means to provide horizontal movement to the device. The primary power or propulsion system was utilized to provide the lift or air cushion to the vehicle while a second power or propulsion system was required to move the device horizontally.

A need therefore exists for an improved, more efficient, ground effect or air cushion platform which can operate with stability at heights up to one-half the vehicle's diameter and move over uneven terrain and inclines. A need also exists for an improved, more efficient, ground effect or air cushion platform which can navigate or transverse physical barriers such as rivers, ditches, canyons, etc. And a need exists for an improved ground effect or air cushion vehicle which derives its horizontal or forward motion from the same power source which provides the lift or air cushion.

SUMMARY OF THE INVENTION

The lift augmented ground effect platform of the present invention is characterized by two pair of annular concentric air curtain nozzles and supercharging nozzles which direct respective jet streams downward and inward beneath the downwardly facing lifting surface of the platform. The concentric arrangement of the nozzles provides an inner or central supercharged air cushion surrounded by an inner central air curtain and an outer or peripheral air cushion surrounded by a peripheral air curtain.

It is known that ground effect vehicles, when operating sufficiently close to the ground to be effected thereby, develop lifting force over that normally provided from the jet thrust. The increased lift experienced as a result of this ground effect of a particular vehicle is frequently termed "augmentation."

The lift augmented ground effect platform of the present invention provides an increased or "large" augmentation of the forces acting to raise or lift the platform over that experienced in prior ground effect devices by directing an airflow stream over the downwardly curved peripheral surface of the platform. As the air flows downwardly along the curvature of the platform's peripheral surface, it creates a pressure differential which provides an additional force supporting the lifting of the platform.

This airflow stream is provided by a propeller or rotating fan device mounted exterior of the platform. The same airstream can be generated with air source(s) mounted interior to the body of the platform which is adapted with a pressure relief duct of the present invention. This propeller means is also the source of the jet stream which is directed into the interior of the platform and delivered through the pair of concentric annular air curtain nozzles and supercharging nozzles to provide the air cushion upon which the platform is raised or lifted.

The provision of the air or jet stream source (the propeller or fan) exterior of the platform body provides two benefits or enhancements for the subject invention. First, the external position of the jet stream source eliminates the problem of propeller or fan stall which may be experienced in ground effect devices constructed with the jet stream source within the body of device. Secondly, the external positioning of the jet stream source provides the previously described airflow over the exterior of the platform which allows the subject invention to smoothly transition into free air (out of ground effect) where necessary to navigate rivers, canyons and other types of physical barriers in which the operating surface necessary for a ground effect device becomes unavailable. As mentioned above, this invention is adaptable to eliminate stall of air stream sources incorporated internal to the body of the platform by including back pressure relief ducts as will be described below.

The ground effect platform of the subject invention can operate as a "stand alone" operational craft by means of control devices provided on the platform. The platform can be made to tilt in any direction, simply to counter any pitch and roll experienced by the platform or to move in a horizontal direction. This is accomplished by disrupting the airflow over the exterior of the platform which disrupts or decreases the amount of lift being generated over that portion of the platform. Alternatively, the air stream exiting the peripheral air curtain nozzle may be selectively disrupted, again resulting in a tilting of the platform which will result in horizontal movement of the platform.

The transition from simply vertical air cushion movement of the platform to actual forward or horizontal movement is accomplished entirely from the manipulation of the power source and the jet stream that provides the air cushion.

The stability of the lift augmented ground effect platform of the subject invention is provided by a platform lifting surface which curves upwardly and outwardly from the bottom of the platform to form an arcuate restoring surface which is positioned with respect to the outer or peripheral air curtain nozzle. When a disturbance such as a gust is sufficient to cause the pitch or tilt down of one side or other of the vehicle, the vehicle rotates about its center of gravity: one side goes down and the opposite side goes up. This causes the upside peripheral nozzle system to be elevated to an operating height in excess of its design equilibrium position. The peripheral nozzle is designed to function in free air (out of ground effect) as a coanda nozzle with the air exiting the nozzle attaching to the downwardly and inwardly curving surface skin (restoring surface) which connects with the bottom skin of the vehicle. When operating in ground effect, the back pressure of the peripheral air cushion prevents the air curtain wall exiting the peripheral nozzle from attaching (i.e., in ground effect, the peripheral nozzle does not function as a coanda nozzle). Now, in response to a gust pitching one side of the vehicle down, the opposite side is suddenly elevated to conditions which the elevated nozzle sees as free air conditions. Instantaneously, this part of the elevated peripheral nozzle begins to function as a coanda nozzle and the airflow attached to the curved underside and flows downwardly and inwardly under the vehicle bottomside. A part of the lift vector which was producing lift around the top surface of the periphery of the vehicle, that part affected by the coanda nozzle suddenly functioning shifts from vertical, pointing up, to horizontal, pointing away from the vehicle body. These changes occur simultaneously. The immediate result is a very strong restoring moment which develops because the lift vector on the pitched down side is still there and functioning to lift that side up again, as is gravity working to drop the side of the vehicle with the now more active coanda nozzle.

The lift augmented ground effect platform of the present invention is intended to be operable both as a self-contained, ground effect unit and as a lifting and landing augmentation system utilized in conjunction with another, separate vehicle, platform or body. In this second instance, as a lifting and landing ground effect lift augmentation system, the present invention can be usefully viewed as containing two parts: a source of air (prop or fan, transmission & engine) and an air management platform. In such a configuration, the platform may be remotely detachable and reattachable to and from, respectively, a separate vehicle. The separate or second vehicle is adapted to mount to the platform and is configured to have the source of air to create the air flow needed for operation of the platform. Utilization of the platform and location of the air source in the separate vehicle provides added capability for, as an example, more fuel storage and payload space within the platform. Use of the lifting and landing augmentation system of the present invention also adds to the separate vehicle the improved aerodynamic ground effect characteristics of the air management platform thereby providing extended mission range and duration capability. Once a predetermined location has been reached using ground effect operation, the separate vehicle may be detached from the platform so that the separate vehicle may maneuver free of the platform for autonomous remote surveillance or other activities. The separate vehicle may also be capable of reattachment to the platform for refueling as required by a specific mission. Being configured to detach from the platform, the second vehicle is capable of maneuvering with less weight. Reduction of its operational weight and aerodynamic configuration drastically alters the available flight envelope of the second vehicle such that it may operate out of ground effect and achieve free vertical and horizontal flight much like that of a helicopter. Given that such free flight characteristics can be less efficient over long distances than ground effect operation, the second vehicle may maneuver around the predetermined remote operations area and then reattach to the lifting and landing air management platform for return to the base as a lift augmented ground effect platform vehicle.

Accordingly, it is an object of the present invention to provide a ground effect platform of the type described which exhibits a relatively large augmentation in lift up to heights approximating the physical diameter of the platform.

Additionally, it is an object of the present invention to provide a ground effect platform of the type described which is self-stabilizing at all operating heights.

Another object of the present invention is to provide a ground effect platform which can operate stably at heights greater than previous ground effect platforms.

A further object of the present invention is to provide a lifting and landing ground effect lift augmentation platform system which, when attached to a source of air such as the separate vehicle, operates with more weight carrying capability and increased range and duration, by operating in ground effect mode.

Still another object of the present invention is to provide a ground effect platform which can operate over relatively tall obstructions and negotiate relatively steep inclines.

And, yet another object of the present invention is to provide a ground effect platform which can transition from ground effect to free air for traversing physical barriers which includes situations where the operating surface or ground instantly and severely drops away from the traversing platform.

Still further, it is another object of the present invention to provide a ground effect platform which utilizes the energy of the power source creating the air cushion and lifting force to impart horizontal or forward motion to the platform.

Yet one additional object is to provide a ground effect platform and lift augmentation system which is capable of operation in combination with a separate, detachable and reattachable vehicle which provides the power source for creating the air cushion and lifting force to improve long distance performance and obstacle negotiation capability wherein the separate vehicle is detachable for remote operation at a predetermined remote location.

These and other objects and the advantages of the present invention will become apparent from a consideration of the following detailed description when taken in conjunction with the accompanying drawings.

DESCRIPTION OF THE DRAWINGS

FIG. 1 is a perspective view of the lift augmented ground effect platform embodying the present invention;

FIG. 2 is a cross sectional side view in enlarged scale taken along the line through the center of the platform dividing it into two equal sectional halves;

FIG. 3 is a bottom plan view of the ground effect platform shown in FIG. 1;

FIGS. 9a and 9b show an embodiment of the subject invention in which the air source is shrouded;

FIG. 10 is a schematic of the subject invention illustrating the forces acting upon the platform when it is disturbed from equilibrium;

FIGS. 11a–11d illustrate alternative embodiment of reverse thrusts for controlling pitch and roll;

DESCRIPTION OF THE PREFERRED EMBODIMENTS

Figure 2A:
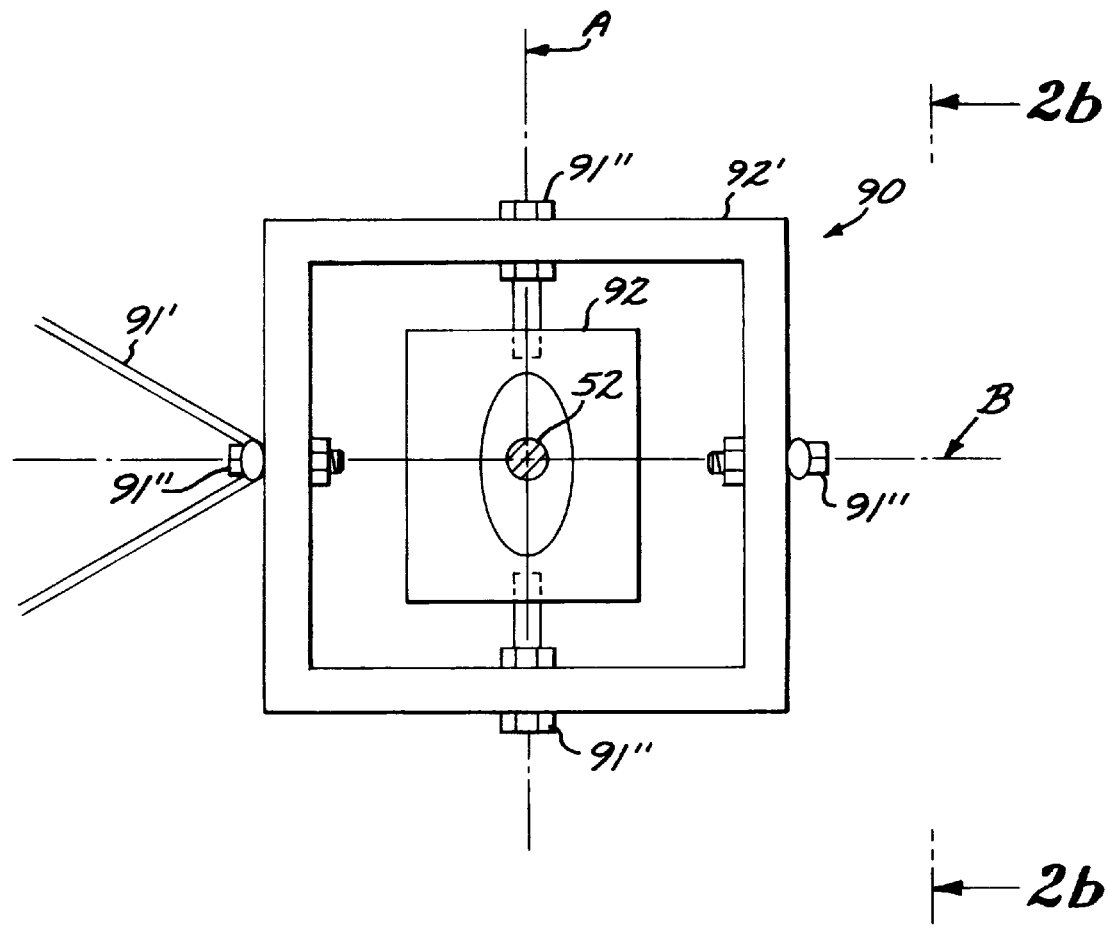
FIG. 2a is a top-plan view in enlarged scale of the embodiment shown in FIG. 2 having portions of the vehicle removed to illustrate a gimbal mechanism.

Referring to FIGS. 1, 2 and 3, the basic lift augmented ground effect platform of the present invention includes, generally a body 10 formed with a circular or symmetrical, near circular core 20 which is covered by an outer annular skin 22. The symmetrical near circular configuration could be a polygonal configuration which approximates a circle, such as an octagon. The cover skin 22 is formed with a central opening defining a jet intake 24 and is spaced from the core 20 to form triple arcuate ducted flow paths 26a, 26b, and 26c extending radially outward, curving downwardly around the arcuate periphery of the core 20. A pair of arcuate dividing rings 28 and 30 are interposed in the passage between the annular skin 22 and the core 20. The divider ring 28 closest to the annular skin 22 provides a duct for air entering at the uppermost air intake 26a and exiting from a peripheral downwardly facing air curtain nozzle 32 which directs a peripheral jet stream 35 downwardly and eventually outwardly in the presence of a horizontally oriented operating surface. Jet stream 35 forms a peripheral air curtain 29 and which encircles the outside periphery of body 10. The divider ring 30 closest to the core 20 provides a duct for air entering at intake 26c and exiting from a central air curtain nozzle 33 which opens inwardly to direct an annular central jet stream 36 inwardly along the bottom surface 38 of core 20 until it encounters opposing airflow, from nozzle 64, that causes it to turn downwardly and then curve outwardly to form a central air curtain wall 40 of circular configuration from within which is formed a central air cushion plenum chamber 42. The air curtains exert forces and form barriers which contain the respective cushions thereby creating a pressure which supports part of the platform weight. The central air curtain wall 40 cooperates with the peripheral air curtain wall 29 to form an annular-shaped peripheral plenum chamber 44 that provides a lifting or supporting force on the platform throughout an annular section of the downwardly facing lifting area 38, the downwardly facing exposed external surface of the core 20, and on an upwardly and outwardly curved restoring surface 48. Air is provided to peripheral plenum chamber 44 via duct path 26b which is formed between dividing rings 28 and 30. The air or jet stream is delivered to chamber 44 by means of peripheral charging nozzle 46. The referenced dividing ring 28 is arcuate in vertical cross section to form the upwardly and outwardly curved restoring surface 48 that surrounds the lifting surface 38 (the exposed undersurface of central core 20).

In the preferred embodiment, the diameter across the central air curtain nozzles is 0.707 of the diameter of the peripheral air curtain nozzles. This provides equal working area within each air cushion chamber 42 and 44.

A jet stream is introduced into central air cushion plenum chamber 42 by means of ducts 26d positioned through the body of the core 20. Central air cushion or supercharging nozzles 64 are provided for directing the jet stream into air cushion chamber 42.

In a preferred embodiment, the base of the underside of the platform represented by the exposed lifting surface 38 of the core 20 has a dihedral configuration, with angle theta, $\theta$, to assist in providing inherent static and dynamic stability in pitch and roll modes.

Referring to FIG. 2, the central core 20 contains or supports power source 50 preferably a conventional internal combustion or turbo shaft aircraft or helicopter engine. Alternate locations for the power source within core 20 will be obvious to those skilled in the art and include air moving or manipulating sources, mounted interior or exterior to the platform body, driven by the power source. The power source transmission 52 drives an air moving means such as a conventional aircraft single or multi-bladed propeller 54 or a single or multiple stage axial fan. In the multiple stage configuration, the air moving means or source may include counter-rotating propellers, compressors and or fan stages which ensure that no net torque from blade rotation will be imparted to the body of the platform. As will be discussed in detail later, the propeller or fan 54 may be either shrouded or unshrouded depending upon the particular operating parameters associated with the particular application of the platform of the subject invention. As illustrated in FIG. 2, the propeller or fan 54 is positioned above and external to the body 10, the propeller 54 is aligned with jet intake 24 which intake opening may be equipped with a remotely controllable louvered cover 56 (see, e.g., FIG. 4). Jet intake 24 opens into internal cavity 25 which feeds the air or jet stream to the air ducts 26 *a–d*. Additionally, the power source 50, transmission 52 and or air moving means 54 may be adapted to be mounted by a gimbal mechanism to the body 10.

Figure 2B:
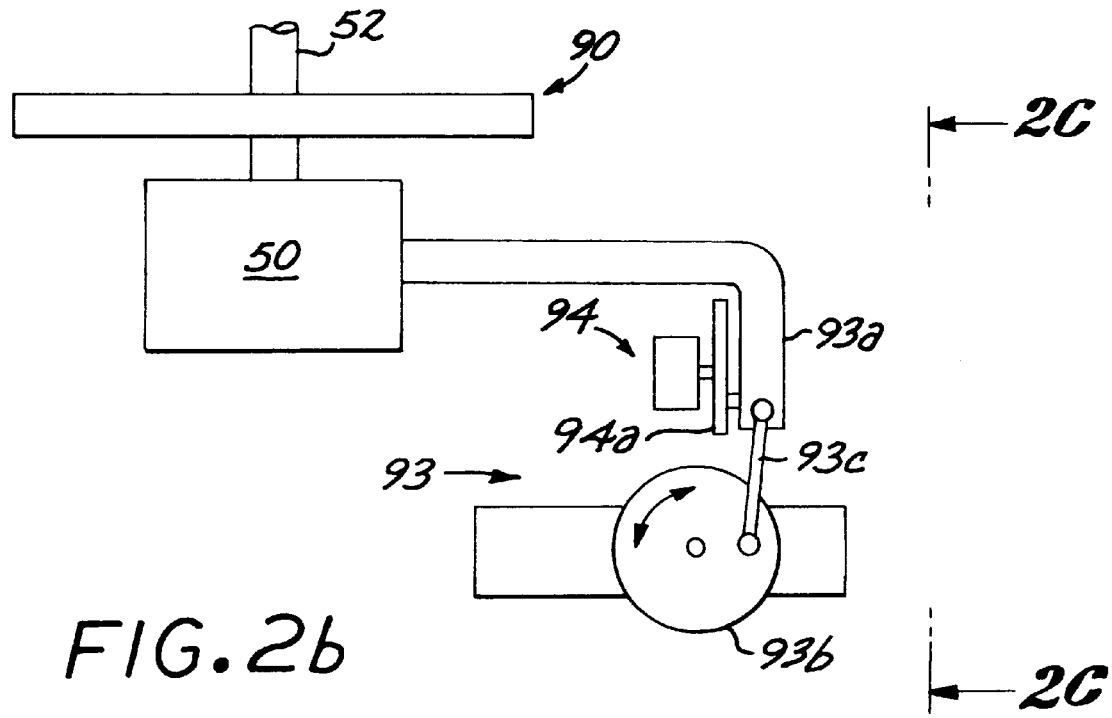
FIG. 2b is a side view taken along line 2b—2b, rotated, showing the gimbal mechanism actuators.
Figure 2C:
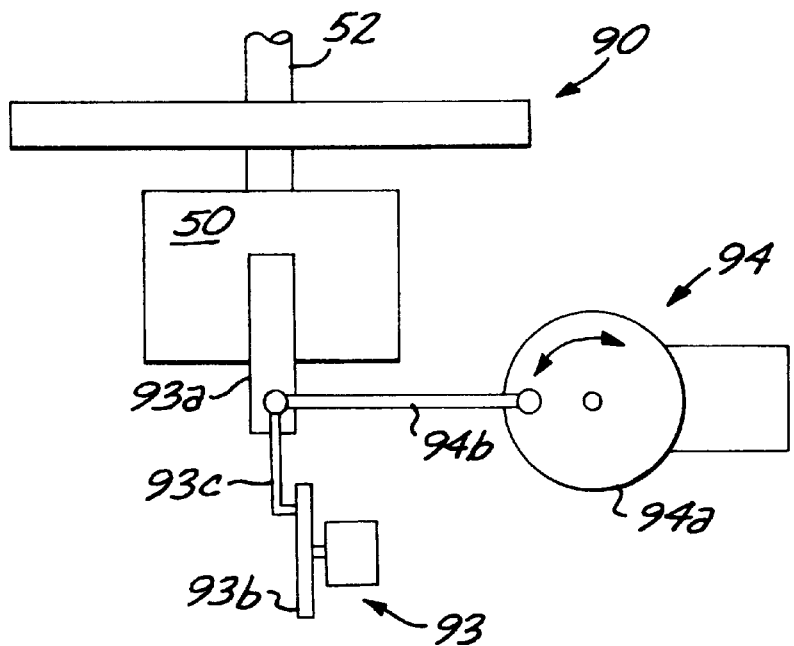
FIG. 2c is a further side view of FIG. 2b taken along line 2c—2c, showing further details of the gimbal mechanism actuators.

Referring next to FIGS. 2*a*, 2*b* and 2*c*, an illustrative example of a two-axis gimbal mechanism 90 is schematically represented. The transmission 52, which in this example is schematically depicted as a propeller shaft, is shown in cross-section. The gimbal mechanism 90 includes a collar assembly adapted to be joined to either the power source 50 or the transmission 52. The assembly incorporates a through hole or journal bearing through its center portion and pivot bolts 91', for attaching an inner collar 92 about its center-line axis "A" to an outer gimbal brace 92'. The gimbal brace is mounted, in turn, to body strut mounts 91' which are rigidly attached to the body 10. The strut mounts 91' are attached with bolts or shafts 91" to the gimbal brace 92' such that the brace can rotate about a second axis "B" which is coplanar but orthogonal to both the center-line axis "A" of the inner collar and to the thrust line of air source 54. The coplanar orthogonality of the respective axes establishes the two-axis gimbal capability. The body struts 91' are rigidly mounted to the body 10 with any of various types of structural vibration damping mounting brackets, such as, for example, heavy-duty rubber padded brackets similar to engine mounts well-known to the automotive industry. Referring now to FIGS. 2*b* and 2*c*, gimbal mechanism 90 also includes two remotely-operable gimbal mechanism actuators 93 and 94. The actuator 93 of FIG. 2*b* schematically depicts an actuator including a control arm 93 mounted to the power source 50 at one end and at another end to a servo-motor controlled, rotating cam 93*b* by control rod 93*c* which includes ball pivotable rod-end bearings at each end. The actuator 94 of FIG. 2*c* is similarly configured. The actuators 93, 94 are designed to be controlled by any number of different radio-frequency or on-board autonomous flight control systems which are known to the art.

In operation, the gimbal mechanism 90 is operative to tilt the generally vertical thrust line of air source 54 to create a horizontal component of the thrust vector directed in the forward reverse, left or right directions to cause the vehicle to move in a corresponding direction. The gimbal mechanism of the present invention is capable of changing the angle of the power source 50 and transmission 52 which changes the angle of the plane of rotation of the air moving source 54 with respect to the body 10. The mechanism 90 is adapted to deflect or tilt the air source 54 approximately between one to seven degrees from the vertical in any direction. The mechanism 90 includes mechanical or electro-mechanical stops which prevent deflection beyond this predetermined range of motion to prevent stall or instability. The range of motion must also be constrained so optimum air flow about the platform below is maintained to ensure proper ground effect operation. As explained, tilting of the air-source operates to create a horizontal component of the otherwise upwardly vertical thrust vector of the air moving source 54. The horizontal thrust component serves to move the platform in a consonant horizontal direction.

In a preferred embodiment of the present invention, designed to maximize the air cushion ground effect stand off height to increase the total payload, range and duration capability of a lifting and landing augmentation system, e.g., as would be utilized in conjunction with another separate vehicle, the propeller or fan would have a diameter approximately equal to the opening 24.

In a preferred embodiment for a self contained lift augmented ground effect platform with the ability to transition into free air, the propeller or fan diameter is larger than the jet intake opening 24 diameter, extending at a minimum over the top of the platform annular cover skin 22 to a point where the surface of the cover skin 22 begins to curve downwardly as it begins its arcuate segment approaching the periphery of the platform. This is illustrated in FIG. 2. Thus, assuming the louvered jet intake cover 56 is open, ambient air entering the propeller near the propeller hub 58 will enter through the jet intake 24 into internal cavity 25 wherein it will be introduced into the internal ducting system, ducts 26*a*, 26*b*, 26*c*, and 26*d*, exiting through the nozzles 32, 33, 46 and 64 respectively, whereas air 60 passing through the propeller tips or ends will flow downwardly and outwardly, as shown by air stream 65', over the outside of the cover skin 22 without entering the platform intake 24. Air entering the intake plenum through the open louvered cover 56 will either enter the peripheral ducting system 26*a*, 26*b*, 26*c* or flow through the vertically positioned central supercharging ducts 26*d* located in the center of the platform core 20. Supercharging air entering the duct 26*d* will exit nozzle 64 into the pressurized central air cushion plenum chamber 42 formed under the central region of the underside of the platform within the central annular air curtain wall 40. The peripheral air cushion plenum chamber 44 is also supercharged by air exiting from the peripheral charging nozzle 46. "Supercharging" as used herein refers to forcing a greater mass of air into the peripheral and central air cushion plenum chambers 42 and 44 respectively than they contain in a normal state as the result of their formation within air curtain walls 29 and 40 within which the air cushions are contained.

Still referring to FIG. 2, it should be noted at this juncture that the ground effect platform of the present invention is supported above its operating surface 1 by three separate, distinct, and independent sources of lift. The first source of lift is momentum thrust from the air jet stream exiting air curtain nozzles 32 and 33 and supercharging nozzles 46 and 64. The second source of lift is the force or pressure of the air cushion acting upwardly against the lifting surface 38 on the underside of the body 10. The third source is aerodynamic lift created by the flow of air over the peripheral outwardly and downwardly facing surface of the cover skin 22. The phenomena producing this aerodynamic lift is commonly known as the coanda effect or coanda principle.

Extensive testing of dynamically similar scale models of the subject lift augmented ground effect platform have confirmed the existence of these three distinct sources of platform lift when said platform is operating in close proximity (ground effect) to an operating surface up to a stand-off height of approximately 50% of the platform diameter. Testing has further shown that the lifting force generated by airflow over skin 22 increases at a greater rate than the other two sources of lift as power is increased. With the application of sufficient power, the subject ground effect platform configured as described above can be made to operate in free air (out of ground effect). It has also been demonstrated that upon closing the louvered intake 56 (no air entering the internal ducting system) that the platform of the subject invention will also operate in free air.

Those skilled in the art will recognize and understand the physical principle that a jet or air stream can be caused to follow a curved path defined by one wall or surface by merely moving a second wall or surface sufficiently close to the first surface to reduce the thickness of the airflow passage defined between said two surfaces below a critical thickness. This critical thickness for air is defined by the equation t/R=0.344 where t is the distance between the two surfaces and R is the radius of curvature of the curved surface. When the flow passage is reduced below this critical thickness, the jet stream will be induced to follow the general curvature of the curved wall. This principle is utilized in connection with design or sizing of both the peripheral air curtain nozzle 32 and the central air curtain nozzle 33. This design configuration results in central air curtain stream 36 following the curved contours of surface 38 during normal operation of the platform. When the platform is operating in ground effect, jet stream 35 does not follow the curved surface of ring 28, even though nozzle 32 is configured as a "coanda" nozzle. This is due to the back pressure created in peripheral air cushion chamber 44. When the platform is operated in free air (out of ground effect) then jet stream 35 follows the curved surface of ring 28.

Utilizing the design criteria discussed above, the ground effect platform of the subject invention achieves operating efficiencies over prior ground effect or air cushion vehicles. Through model testing it has been determined that by providing for the exterior airflow over the curved skin cover 22 the subject platform achieves approximately a 40% increase in the height of the platform over a platform in which airflow is not allowed over skin cover 22. This enhanced augmentation of the ground effect lifting force is obtained without providing any additional power to the propeller or fan 54.

Figure 4:
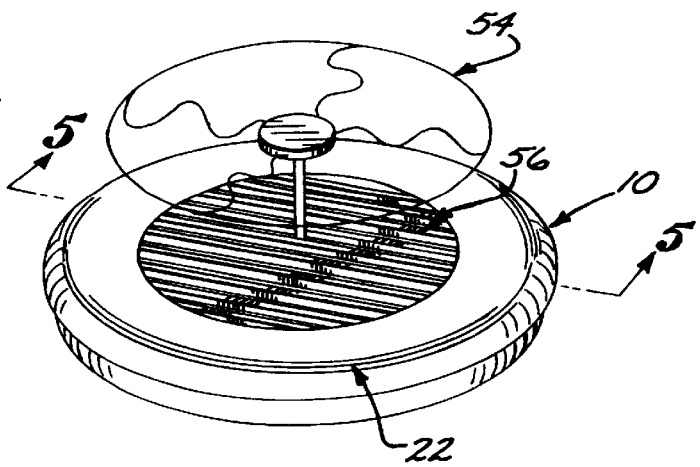
FIG. 4 is a perspective view of the subject invention illustrating the louvered embodiment utilized for out of ground effect operation of the platform.
Figure 5A:
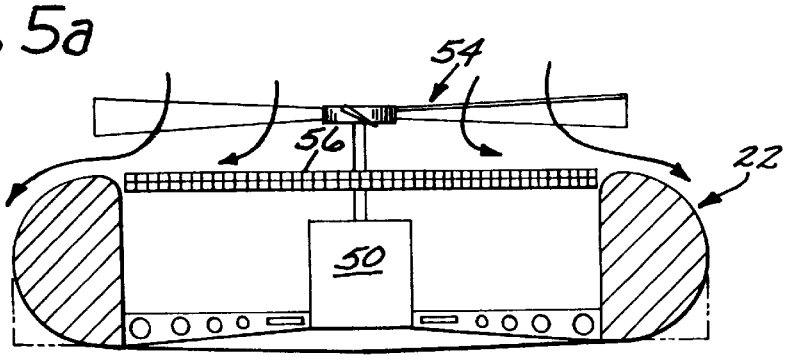
FIG. 5 is a side view of the subject platform illustrating the airflow pattern when the louvers are placed in a closed position.
Figure 5B:
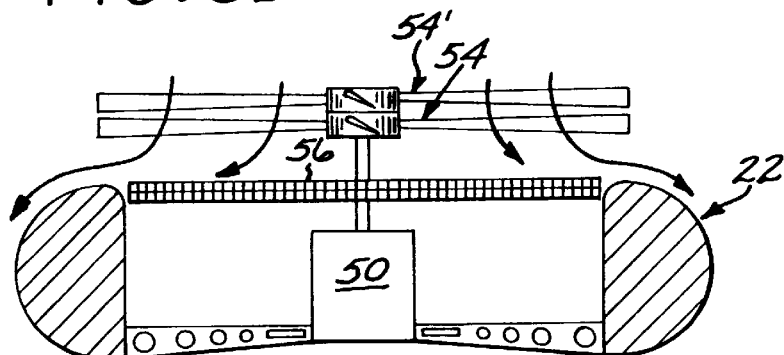
Figure 6:
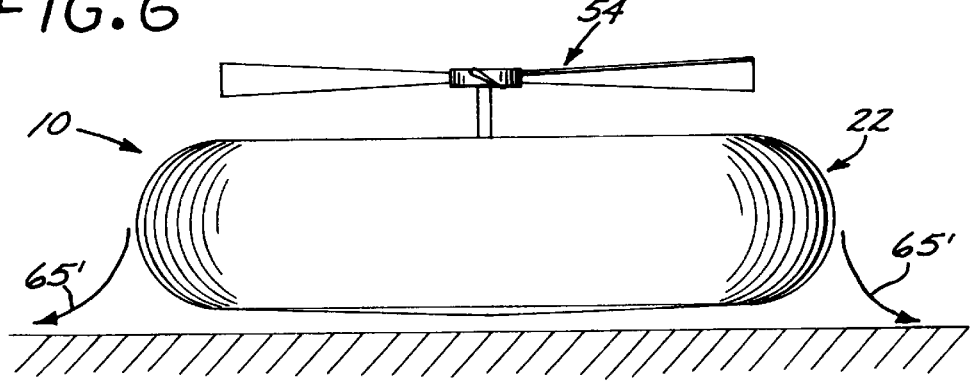
FIG. 6 is a schematic of the platform shown in FIG. 5 illustrating the non ground effect nature of the platform when the intake louvers are closed.

During operation, air entering the jet intake plenum 24 through the open louvered cover 56 (see FIG. 4), may build up an over pressure or back pressure as the air is forced through the peripheral duct paths 26a, 26b, and 26c and the supercharging duct 26d. The amount of air which will flow through ducts 26a–d will vary depending upon the load (weight) imposed upon the platform in a particular application or operation. This in turn creates a varying degree or level of back pressure. Excess back pressure could result in propeller or fan stall. The ground effect platform of the subject invention automatically prevents this excess pressure build up by allowing excess air mass 65 to exit chamber 25 and pass over surface 22, or, for example, through a pressure relief duct or passageway. As can be understood from FIGS. 2, 5a, 5b, 7a, 7b and 9, this exiting air mass or airflow stream 65 joins the flow of air 60 provided through the propeller tips and flows along the curved surface of skin 22 as previously described as airflow 65'. FIG. 5b reflects the embodiment of FIG. 5a but includes a counter rotational propeller 54'.

In operation, the rotation of the propeller or fan 54 will tend to impart a rotational force or torque to the platform body 10. To counteract this torque a plurality of anti-torque vanes 66 are provided on the periphery of the surface 22 as shown in FIGS. 1 and 2. These anti-torque vanes 66 may be curved to direct the airflow 60, 65 and 65' in a direction to more efficiently counterbalance the torque generated by the rotating propeller 54 by imparting an angular momentum to the body 10 in a direction opposite to the rotation of the air source 54. Additional trimming vanes 68 are provided at the peripheral curtain wall nozzle 32. Anti-torque vanes 66 and trimming vanes 68 may be fixed or they may be adjustable by various means known to those skilled in the art.

In order for the air stream 65' to be induced to attach or follow the curved surface 22 an actuating device referred to as a coanda tripper, or air-flow entrainer, is required. This "tripper" acts as the second wall or surface through which the air stream flows. In one embodiment, the positioning of the propeller 54 the proper distance from the platform so that the vortex airflow from the tip of the propeller or fan, impinging on the surface of skin 22 serves as the tripper causing the external flow of air 65' over the skin 22 to attach or flow in an arcuate path along the curved contour of the outer skin 22. This configuration is illustrated in FIG. 2.

Referring to FIG. 9a, an alternate form of coanda trippers in the form of peripheral "barrel hoop" rings 70 is illustrated. The rings 70 or trippers act as the second surface in the coanda nozzle and induce the air flow 65 over skin surface 22 to attach and follow the curved surface. The rings 70 may be attached to the upper surface by any number of different types of supporting device, such as struts, which are not shown in this drawing. FIG. 9a also depicts a configuration of the preferred embodiment adapted to include a ducted air source. FIG. 2 shows the optimum location where additional "tripper" devices 72 could be located about the periphery of the platform to induce the airflow attached to the upper surface of the platform to remain attached and flow downwardly and inwardly under the dihedral lifting surface of the platform, thus increasing the efficiency of the platform in free air operation. These additional tripper devices 72 may be mounted on a circular ring extending about the peripheral edge of the platform body 10. In a preferred embodiment, these would be adjustable, such as by pivoting towards or away from the platform to selectively induce the airflow to follow the curvature of the platform. In operation, the back pressure relief air flow 65 can flow over an external lifting surface, such as, for example, peripheral surface 22, to not only prevent air source stall but also to increase vehicle efficiency by further augmenting lift.

Figure 7A:
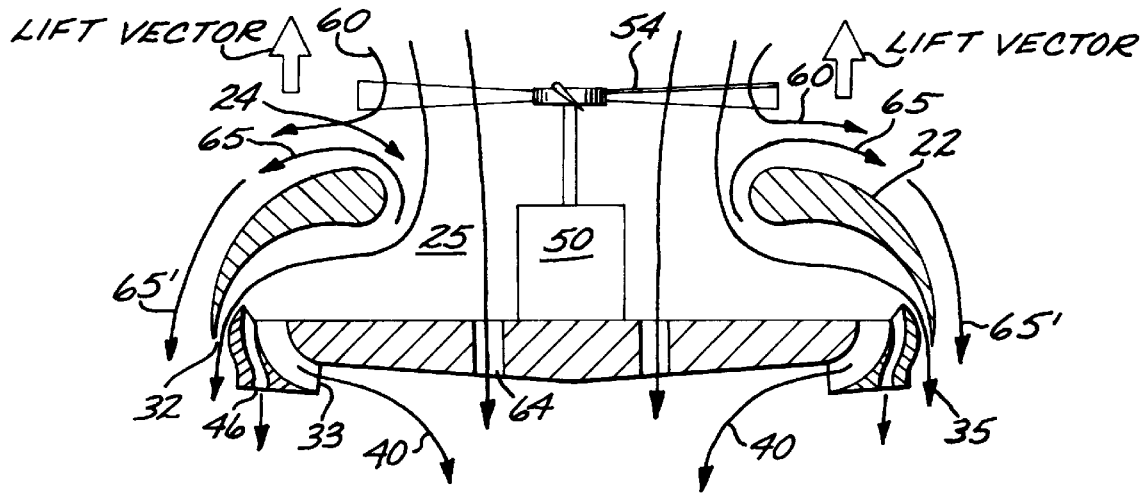
FIG. 7a is a schematic drawing of the airflow patterns in the preferred embodiment of the nozzle configurations of the subject invention.
Figure 7B:
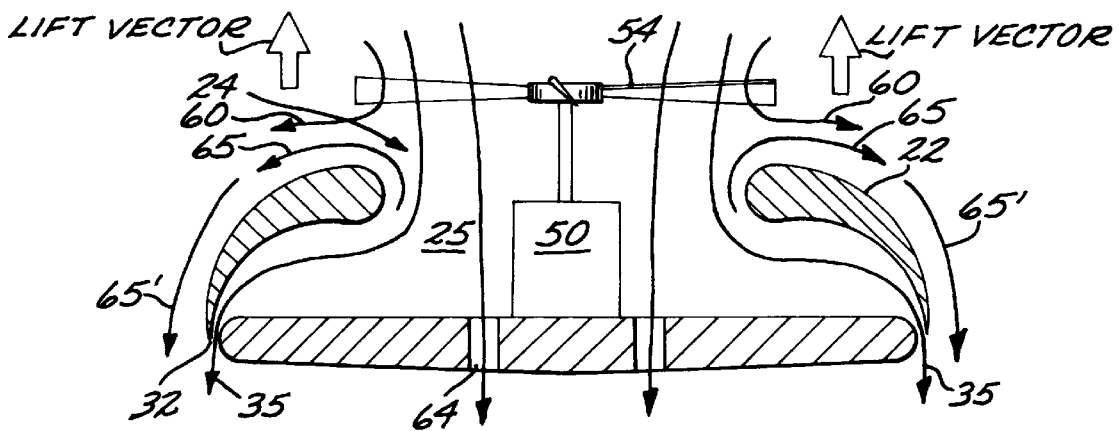
FIG. 7b is a schematic drawing of the airflow patterns in an alternate embodiment of the nozzle configurations.

Referring to FIGS. 7a and 7b, the airflow patterns of two alternate combinations of ground effect platform exit nozzle configurations are illustrated. FIG. 7a illustrates the exit airflow patterns with a simplified ducting system including provision for supercharging. Air is driven by the propeller through intake 24 and into chamber 25. The air flows into the duct system and exits the nozzles as previously described. Excess air 65 exits the chamber 25 and flows over curved surface 22, along with additional air streams 60 and 65'. FIG. 7a illustrates in a somewhat simplified fashion the airflow patterns previously discussed in connection with FIG. 2. FIG. 7b illustrates the airflow pattern in an alternate embodiment in which only a peripheral air curtain nozzle and central air cushion nozzle are provided.

Figure 8A:
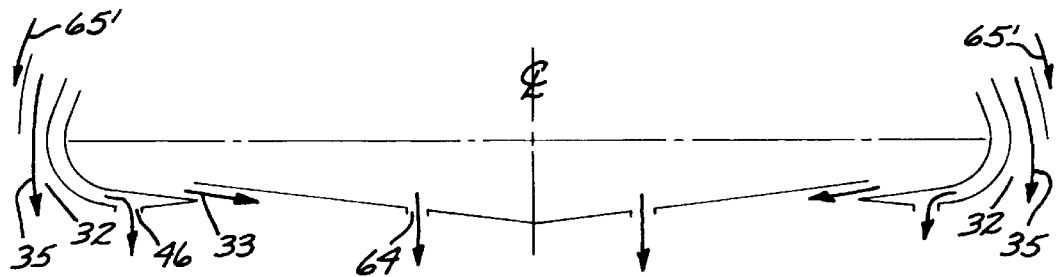
FIG. 8a is a schematic drawing of the nozzle and airflow configuration illustrated in FIG. 2.
Figure 8B:
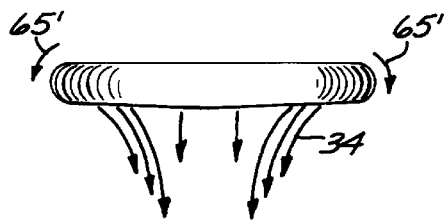
FIG. 8b is a schematic of the airflow pattern of the platform operating in free air.
Figure 8C:
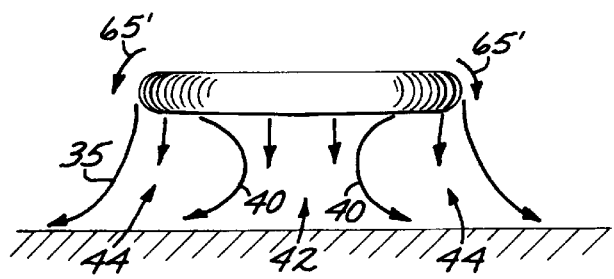
FIGS. 8c–8e are schematic illustrations of the airflow pattern when the platform is operating at varying heights in ground effect.
Figure 8D:
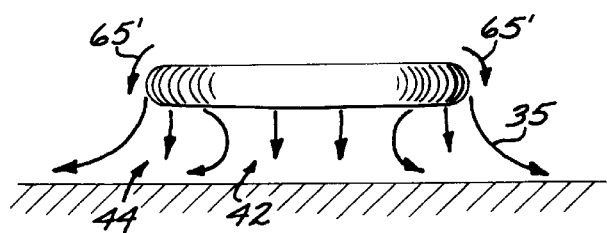
Figure 8E:
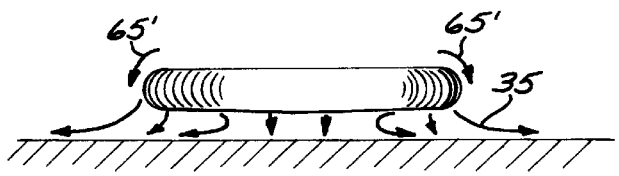

FIG. 8a illustrates the generalized configuration of exit nozzles 32, 33, 46, and 64 for the ground effect platform of the present invention excluding pressure relief air flow 65. FIGS. 8b through 8e illustrate the airflow pattern which exists at various heights above the operating surface including free air. As discussed previously, the peripheral nozzle 32 only functions as a coanda nozzle (i.e., induces the airflow exiting the nozzle to attach to the curved surface) when the platform is operating in free air. This is illustrated in FIG. 8b. In this configuration, air stream 34 curves under the platform. FIGS. 8c–e illustrate the airflow patterns at varying heights with ground effect. As shown, the air stream 35 curves downwardly and outward with respect to the platform.

FIGS. 9a and 9b illustrate the utilization of a shrouded [prop or shrouded single stage axial fan] air source or moving means as the power source for the platform. The air or power source may be configured with multiple propellers, fans, compressors or stages. These figures reflect a variation of the present embodiment incorporating a shroud 69 which improves air flow through the air source, whether they be single or multi-stage and or counter-rotating propellers, fans, compressors or stages. In FIG. 9*a*, the shroud 69 is flush to the top of body 10 while in FIG. 9*b* the shroud 69 includes a circumferential opening between the lower edge of the shroud and the top of body 10. The latter prevents stall of the air source by providing a pressure relief passageway at the lower portion of the shroud 69. In FIG. 9*a*, the same pressure relief, stall preventing capability is provided by internally ducted pressure relief passageways, not shown, which open through curved surface 22 to the hoop rings 70 and direct the pressure relief air flow over the curved surface 22 of the upper portion of the body 10.

FIG. 10 illustrates the means by which inherent static and dynamic stability in pitch and roll modes is achieved with this nozzle configuration. When a gust generates a downward force on the bow of the platform responds as follows: 1) The nose of the platform pitches downward. 2) The airflow 35 from the bow curtain wall 29 continues to exit directly in line with the physical exit nozzle direction (downward). This portion of the bow curtain wall 29 does not respond as a coanda nozzle due to the back pressure of the peripheral cushion 44 which prevents this performance. 3) The center of gravity of the platform drops only a very small fraction in reaction to the gust since the central supercharged cushion 42 sustains the stand-off height and the platform tends to rotate about its center of gravity. 4) The stem of the platform, opposite the bow, is above the plane of the center of gravity thus creating a condition on the rear coanda nozzle such that, due to its elevation above the equilibrium condition the stem air curtain wall 29 no longer experiences the cushion back pressure. Behaving normally as a coanda nozzle, a large portion of the peripheral air curtain wall 29 attaches to the curved part of the stern coanda nozzle, curving inwardly and downwardly, along restoring surface 48, see FIGS. 2, 8*b* and 10, as shown by air stream 34, beneath the underside of the platform. 5) The action of the coanda nozzle creates a negative pressure thus drawing in ambient air and further induces the air flow 65' over the curved skin 22 to attach and augment the mass flow under the platform stem. A lift force is also created in the plane of the platform extending rearward. 6) The horizontal component of the shifted resultant lift vector has a moment arm above the center of gravity which creates a strong restoring moment acting in opposition to the gust force. When the gust departs the restoring moment acts to restore equilibrium within a 1½ cycle restoration period.

Figure 11C:
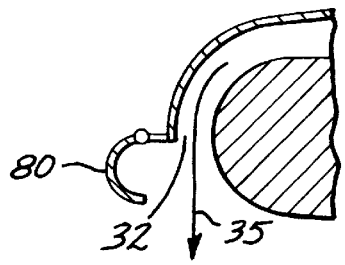
Figure 11D:
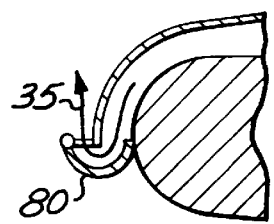

Control in pitch and roll mode is accomplished by moving reverse thrust (semicircular shaped troughs) into the air stream 35 exiting the peripheral air curtain wall exit nozzle. This is illustrated in FIGS. 11*a*–11*d*. These reverse thrust devices 80 occupying the bow and stem regions on the platform and also both left and right sides of the platform. They are actuated by remote control means (not shown) or by a human operator employing a simple bellcrank and pulley system (not shown) when moved into the airflow these reverse thrust devices 80 produce a thrust which produces a downward pitching moment, pitching the nose down or up as desired or banking the platform to the right or left as desired (drawing not shown). Thus the platform can be made to accelerate into horizontal translative motion or stopped (braked) with this control system. Also, this pitch control mechanism allows the platform operating at stand-off heights approaching ½ platform diameter or width to climb steep slopes (up to 20 degrees and descend steep slopes). As shown in FIGS. 11*a* and 11*b*, the reverse thrusters may be slidably moved into the air stream, or as shown in FIGS. 11*a* and 11*d* they may be rotated or pivoted about a hinge into and out of the air stream.

Figure 12:
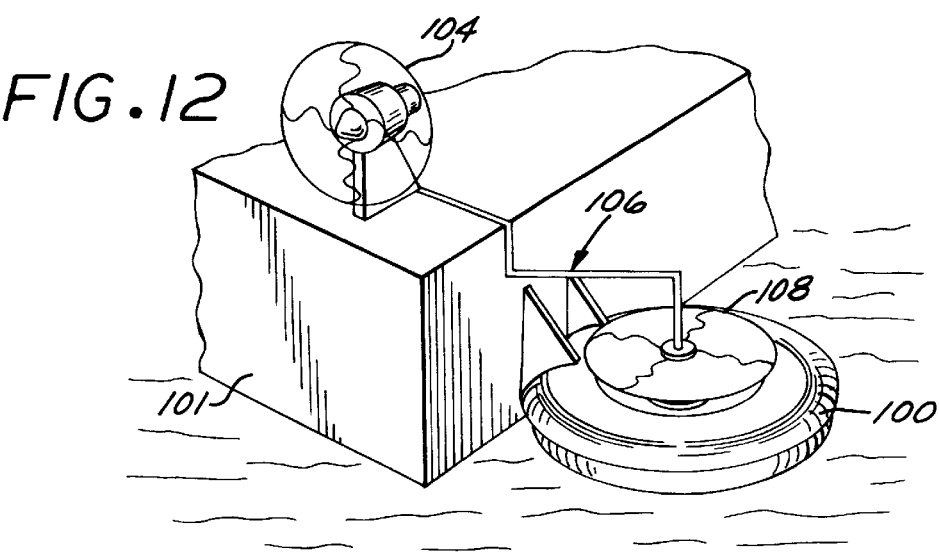
FIGS. 12 shows one embodiment of the subject platform used as lifting and land ground effect augmentation system in combination with another vehicle.

Having described the construction and operation of the basic improved ground effect platform of the subject invention, alternate embodiments of the invention for particular applications will now be described. As described and illustrated, the subject platform may be employed as a lifting and landing device to provide vertical movement to another body or device. One such embodiment of this application is depicted in FIG. 12. Other alternative embodiments are reflected in FIGS. 16*a*, 16*b*, 16*c* and 16*d*.

In the embodiment of FIG. 12, the platform 100 is connected to or mounted on another vehicle, such as a wing in ground effect ("WIG") vehicle 101. Such vehicles operate in ground effect, however, they utilize the lift from traditional wings rather than an air cushion to provide the lift. Such vehicles suffer, however, from the requirement of carrying additional propulsion units or systems needed to provide the initial vertical lift of the vehicle and support it above the operating surface until such times as the vehicle has achieved sufficient horizontal speed to effect adequate lift off of its wings. Once it is operating in the WIG mode, less energy or force is required to maintain its forward motion than was required to obtain the initial lift. Thus, such vehicles are forced to carry the weight of the excess lifting capacity.

As also shown in FIG. 12, utilization of the subject platform solves this problem traditionally encountered in WIG vehicles. The WIG vehicle is powered by the WIG propulsion system 104. This may be a fan jet, turbo prop or other known systems utilized for providing power or thrust to "winged" vehicles To eliminate the weight and inefficiency of carrying a separate power source to provide the initial vertical lift of the WIG the platform 100 is provided with a hydraulic propulsion system which is driven or powered by the WIG propulsion system 104. Hydraulic power lines 106 are provided which connect the WIG propulsion unit with the platform hydraulic power unit. In this embodiment, the propeller 108 of the platform 100 is driven by the hydraulic power unit. The platform provides lift as previously described. Thus, the WIG vehicle is lifted off of its operating surface by the same propulsion unit which provides its forward thrust. No additional power units or fuel are required. Once the WIG vehicle has risen a sufficient height, its forward motion provides lift off of its wings sufficient to sustain the vehicle in ground effect flight and the lifting force of the platform 100 is no longer needed. At that time the hydraulic power unit may be turned off and the platform is essentially "turned off." In order to reduce air drag, the platform 100 may be connected to the WIG vehicle on retractable supports, similar to the landing gear of an airplane, which would allow the platform 100 to be retracted out of the airflow. Alternate means of connecting the platform to a WIG or other type of vehicle will be readily apparent to the those skilled in the art.

Similarly, other means of powering the platform 100 off of the WIG propulsion system 104 can be used. These include rotating one unit of the WIG system downward to direct its thrust over the platform thereby providing lifting through the platforms ducting and nozzle system and through the airflow over the exterior of the platform. Upon achieving the correct lift off height and sufficient forward motion this power unit could be rotated back to its normal operating position to provide forward thrust to the vehicle. When utilizing the subject invention as a lifting and landing platform for other vehicles, more than one air management augmentation system platform may be needed to provide the necessary lift and to provide operational stability to the WIG or other vehicle.

As previously discussed, the subject ground effect platform is also intended to function as a "stand alone" air cushion vehicle. This may be in either a manned or unmanned, remotely controlled configuration. In the stand alone mode, the platform must be provided with control systems for providing directional control to the platform. Alternate embodiments of control systems are shown in FIGS. 2a, 2b and 2c; 13a and 13b; 14a and 14; and 15a and 15b.

Figure 13A:
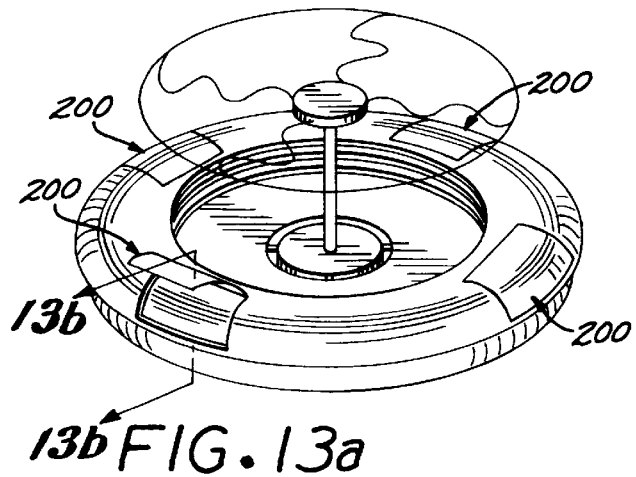
FIGS. 13a and 13b show a first embodiment of a control apparatus for the subject platform.
Figure 13B:
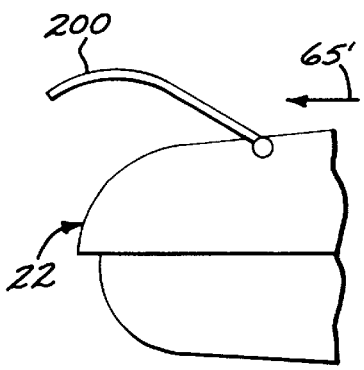

The first embodiment shown in FIGS. 13a and 13b utilizes a "control panel" design. In this embodiment, areas in the bow, stem, port and starboard sides of the peripheral skin 22 are provided with rectangular shaped control panels 200 hinged along the inner edge of intake 24. By raising one of the panels 200 as shown in FIG. 13b, the air flow is disrupted in that location which spoils or disrupts the lifting force over that section of the platform. This will result in the lowering or dropping of that portion of the platform. This controlled pitching of the platform will result in the formation of a horizontal force vector which provides horizontal movement to the platform.

Figure 14A:
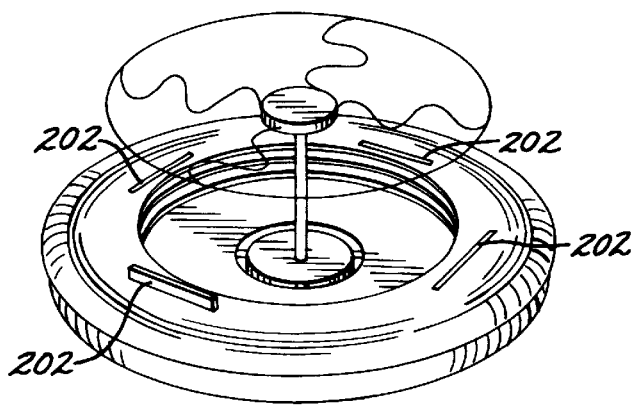
FIGS. 14a and 14b show a second embodiment of the control apparatus for the subject platform.
Figure 14B:
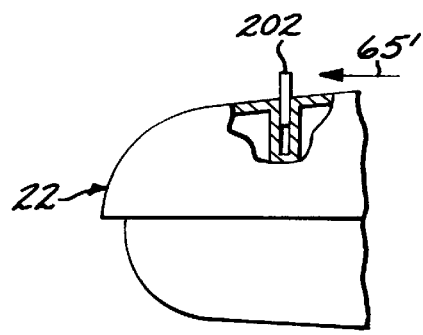

A second embodiment of the control mechanism is shown in FIGS. 14a and 14b. This is a "spoiler system" in which spoiler plates 202 are retractably mounted in the platform body. When the spoiler plate 202 is raised upward into air stream 60, 65 and 65', it disrupts the airflow and lift causing that side of the platform to drop.

Figure 15A:
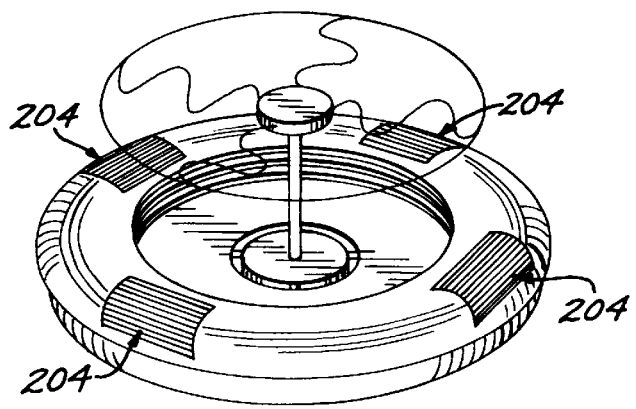
FIGS. 15a and 15b show a third embodiment of the control apparatus for the subject platform.
Figure 15B:
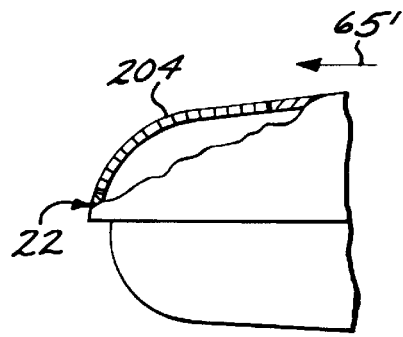

In FIGS. 15a and 15b another embodiment is shown in which a louvered panel is utilized. In operation, the louvers are normally closed allowing for airflow over the platform. By raising the louvers 204, the airflow 60, 65 and 65' is disrupted and that portion of the platform tilts or drops. The gimbal system is designed to allow the thrust line to be changed from a central position, providing directional control of the vehicle and can be adapted to operate in stand-alone mode or in cooperation with the above-described control systems.

As discussed, one of the features of the subject invention is its ability to operate out of ground effect or in free air. This feature enables the subject platform to navigate physical barriers such as rivers and canyons where the operating surface (ground) suddenly drops off or is otherwise unable to provide an air cushion support for the vehicle. To operate in free air, the air intake 24 is provided with a rotatable louvered closing system as shown in FIG. 4. In normal ground effect operation, louvers 56 are maintained in an open position. This allows for airflow into the platform and through the duct system to provide the air cushion support for the platform.

When it is desired to operate the platform out of ground effect, the operator closes the louvers 56 which blocks off the duct and nozzle system. This results in all of the jet stream generated by the propeller 54 to flow over the curved skin 22. This increased airflow creates an increased aerodynamic lift over surface 22 which enables the platform to travel or "fly" in free air. Thus, unlike other ground effect air cushion devices the present invention can be operated effectively without a supporting or operating surface. When operating in free air, it must be noted that the power source must be operated at a higher level than when operated in ground effect in order to provide sufficient lift to the platform.

Referring now to FIGS. 16a, 16b, 16c and 16d, alternative embodiments are illustrated which include a separate, detachable and reattachable vehicles 10' which operate in combination with a lift augmented platform 10. In these alternative configurations, the air source of previous embodiments is removed from the platform 10 and is incorporated into the second vehicle 10' and may also, as with previous embodiments, include single or multi-stage propellers, fans, compressors and or stages. As previously described, the separate vehicle 10' is releasably attached or permanently affixed to the platform 10. The power source drives an air moving means operative to create the air flows over and through the platform 10 which is mounted beneath the separate vehicle 10'. The vehicle 10' is adapted with an inner, bell-mouth shaped passageway 69 for improving efficiency of air flow through the vehicle 10' and to better manage the air flowing through and over the platform 10.

Figure 16A:
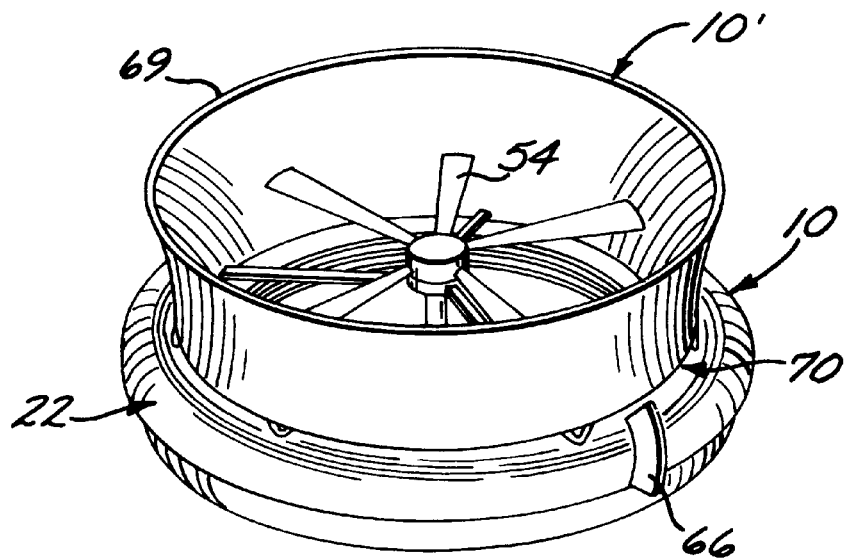
FIGS. 16a, 16b, 16c and 16d illustrate alternative embodiments which include separate, detachable and reattachable vehicles which operate in combination with a lift augmented platform of the present invention.
Figure 16B:
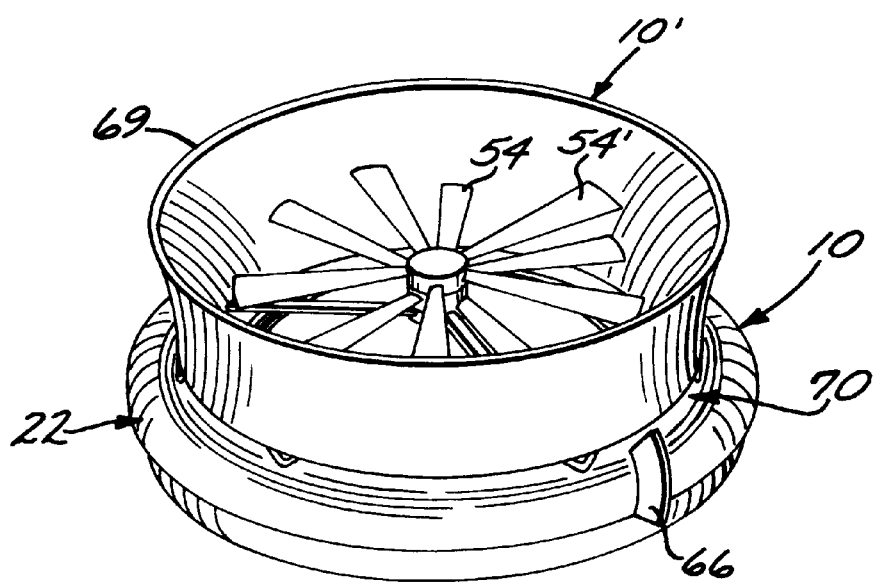
Figure 16C:
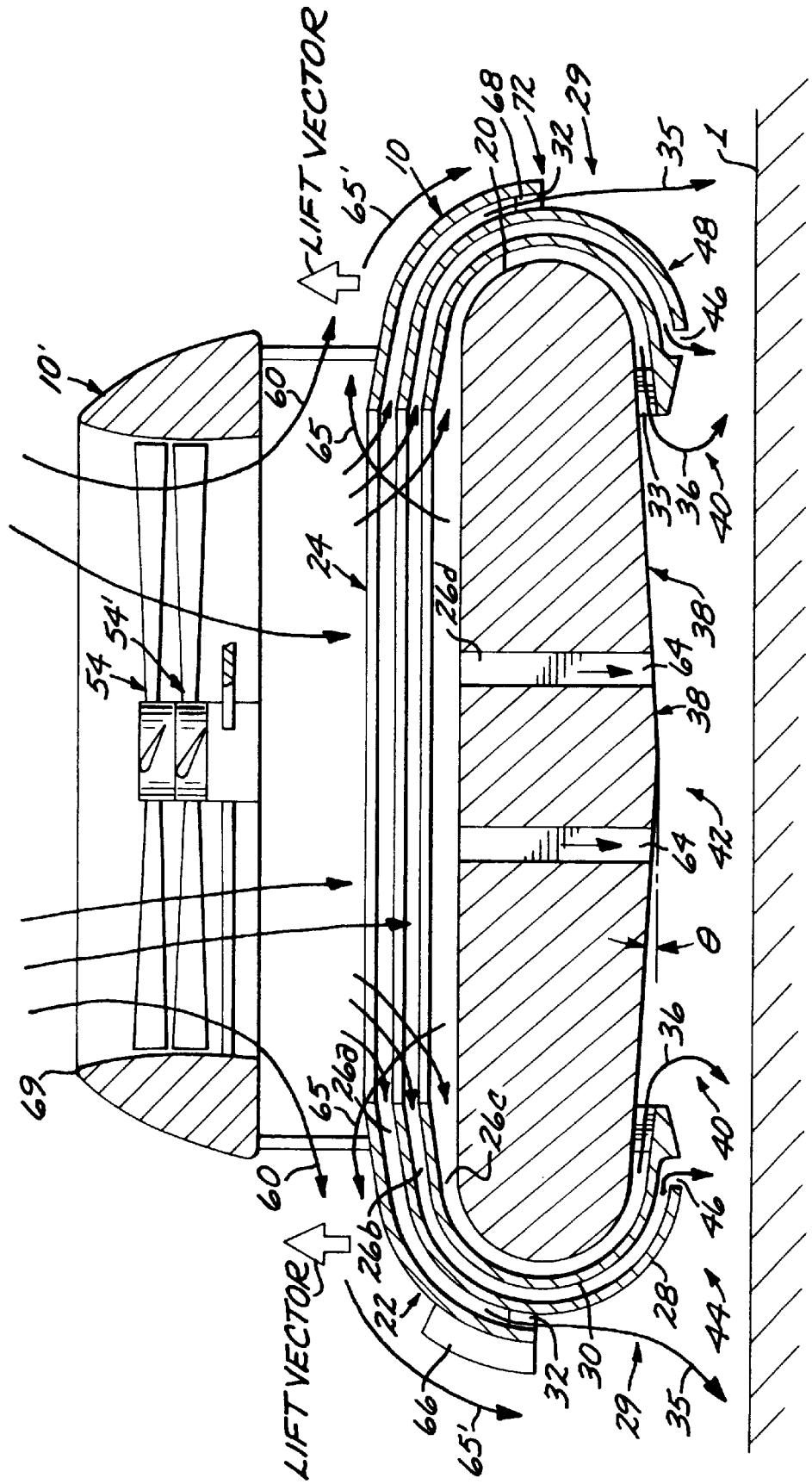
Figure 16D:
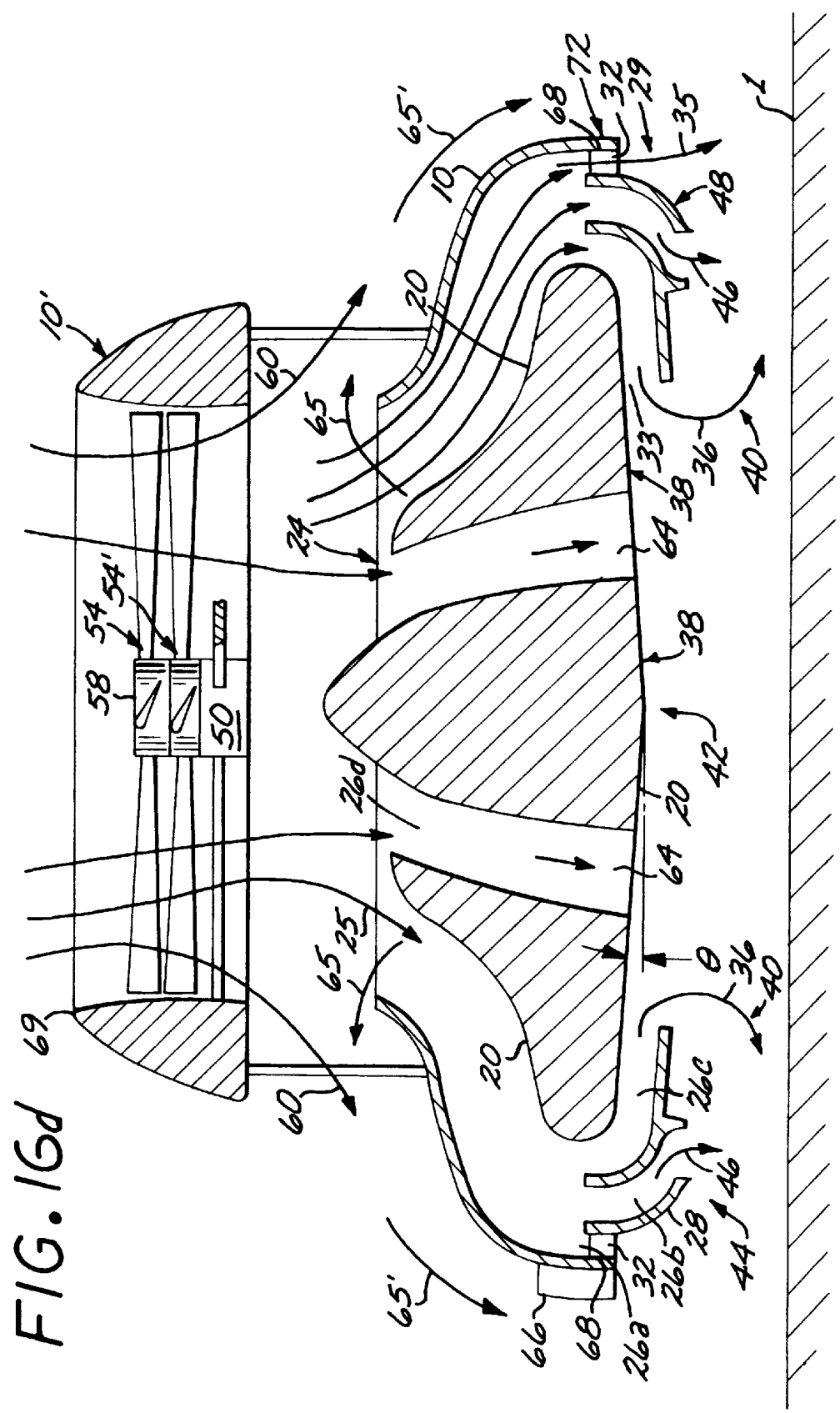

The air management augmentation system platform 10 acts to, when attached to the vehicle 10', improve the performance of the combined vehicle 10' and the platform 10 in several ways. Most importantly, the platform 10 serves to improve the aerodynamic ground effect efficiency of the combination. Since the power source is removed, the platform 10 may include additional fuel stores for increasing range to reach a remote destination along with the ability to carry additional payloads for other purposes. Once the remote destination has been reached, the separate vehicle 10' may be detached, by remote control or under its own autonomous or pre-programmed schedule, from the platform 10 whereby the vehicle 10' may move about free of the extra payload of the platform. In this mode, the vehicle 10' would be capable of reaching greater heights above the ground for a variety of operations including, but not limited to, gaining altitude for improving visual range to the horizon for on-board sensor packages. The platform 10 of the present invention is also configured to be reattached by remote control to the autonomous separate vehicle 10' such that it could be refueled or reattached for departure from the remote destination. FIG. 16a reflects a single stage or propeller variation of the present embodiment. FIG. 16b. illustrates a variation including a second air moving means which can be configured for synchronized counter-rotation to effectively minimize or eliminate torque imparted to the vehicle 10' as well as to the combination of the vehicle 10' and the platform 10. FIG. 16c shows a side view of a combination of the vehicle 10' and the lift augmentation system platform 10. FIG. 16d reflects yet another alternative embodiment of FIG. 16c wherein the lift augmentation platform 10 has been modified to incorporate an alternative ducting system contemplated by the earlier described embodiments.

From the foregoing detailed description, it will be apparent that the ground effect platform of the present invention is relatively stable and develops restoring forces which tend to stabilize the platform whenever it has been subjected to any unstabilizing force thereby enabling such platform to operate at greater heights than conventional platforms. It is believed that ground effect platforms constructed in accordance with the present invention will operate at heights of approximately 50 percent of their diameter as contrasted with the presently known platforms which are unstable when operating at a height in excess of 10 percent or 20 percent of their diameter. Consequently, platforms can be made with sufficiently small diameters to enable them to have access to areas that would otherwise be inaccessible and such platforms can operate at a height which will enable them to negotiate over obstacles which would otherwise force selection of alternate routes. Various modifications and changes may be made with regard to the foregoing detailed description without departing from the spirit and scope of the invention.

What is claimed is:

1. An augmented ground effect platform comprising:
   a substantially circular body formed with a downwardly radially curved exterior peripheral surface;
   a downwardly facing lifting surface formed on the underside of said body;
   a peripheral restoring surface extending around said lifting surface and angling upwardly and outwardly with respect thereto;
   an air intake cavity formed in the upper surface of said body;
   concentric annular nozzle means, including a first air curtain nozzle, a first air cushion nozzle, a second air curtain nozzle and a second air cushion nozzle;
   first air passageway means connecting said intake cavity with said first air curtain nozzle, first air cushion nozzle and second air curtain nozzle;
   second air passageway means connecting said intake cavity with said second air cushion nozzle;
   a detachable vehicle releasably attached to the upper surface of said body;
   said vehicle including an air drive means such that said air drive means directs an air flow into the air intake cavity of said body and also over the curved exterior peripheral surface of said body; and
   wherein said body serves as a lifting and landing ground effect lift augmentation system platform for said detachable vehicle.

2. The augmented ground effect platform of claim 1, further comprising:
   a gimbal mechanism adapted to releasably attach said detachable vehicle to said body and operative to, upon actuation, change the relative position of said vehicle with respect to the upper surface of said body.

3. The augmented ground effect platform of claim 1, further comprising:
   a gimbal mechanism adapted to mount said air drive means to said separate vehicle and operative to, upon actuation, change the relative direction of said air flow with respect to said air intake cavity.

4. The augmented ground effect platform of claim 1, wherein the air moving means includes a power source and first and second counter-rotating propellers.

5. The augmented ground effect platform of claim 1, wherein a plurality of anti-torque vanes are mounted about the periphery of said body and angled with respect to the airflow over the exterior of said body to impart angular momentum to said body in a direction opposite the direction of rotation of said propeller.

6. The augmented ground effect platform of claim 1, wherein control vanes are positioned at said first air cushion nozzles.

7. The augmented ground effect platform of claim 6, wherein said control vanes are adjustable.

8. The augmented ground effect platform of claim 1, wherein airflow disruption means are provided about the upper surface of said body for selectively disrupting the airflow at selected positions about said body.

9. The augmented ground effect platform of claim 1, further comprising reverse thruster means for controlling pitch and roll.

10. An augmented ground effect platform comprising:
    a substantially circular body formed with a downwardly radially curved exterior peripheral surface;
    a downwardly facing lifting surface formed on the underside of said body;
    a peripheral restoring surface extending around said lifting surface and angling upwardly and outwardly with respect thereto;
    an air intake cavity formed in the upper surface of said body;
    concentric annular nozzle means, including a first air curtain nozzle, a first air cushion nozzle, a second air curtain nozzle and a second air cushion nozzle;
    first air passageway means connecting said intake cavity with said first air curtain nozzle, first air cushion nozzle and second air curtain nozzle;
    second air passageway means connecting said intake cavity with said second air cushion nozzle;
    an air drive means, said air drive means being positioned exterior of said body for directing an air flow into said air intake cavity and also over the curved exterior peripheral surface of said body;
    a gimbal mechanism mounting said air drive means to said body and operative to, upon actuation, control the direction of said air flow through and about said body.

11. An augmented ground effect platform, comprising:
    a substantially circular body formed with a downwardly radially curved exterior peripheral surface;
    a downwardly facing lifting surface formed on the underside of said body;
    a peripheral restoring surface extending around said lifting surface and angling upwardly and outwardly with respect thereto;
    an air intake cavity formed in the upper surface of said body;
    concentric annular nozzle means, including a first air curtain nozzle, a first air cushion nozzle, a second air curtain nozzle and a second air cushion nozzle;
    first air passageway means connecting said intake cavity with said first air curtain nozzle, first air cushion nozzle and second air curtain nozzle;
    second air passageway means connecting said intake cavity with said second air cushion nozzle;
    a detachable vehicle releasably attached to the upper surface of said body;
    said vehicle including an air drive means such that said air drive means directs an air flow into the air intake cavity of said body and also over the curved exterior peripheral surface of said body; and
    wherein said body serves as a lifting and landing ground effect lift augmentation system platform for said detachable vehicle.

* * * * *